(12) United States Patent
Xing et al.

(10) Patent No.: US 10,110,047 B2
(45) Date of Patent: Oct. 23, 2018

(54) WIRELESS CHARGING TRANSMISSION DEVICE

(71) Applicants: Yitao Xing, Guangdong (CN); Shouguan Chen, Guangdong (CN)

(72) Inventors: Yitao Xing, Guangdong (CN); Shouguan Chen, Guangdong (CN)

( * ) Notice: Subject to any disclaimer, the term of this patent is extended or adjusted under 35 U.S.C. 154(b) by 214 days.

(21) Appl. No.: 15/201,600

(22) Filed: Jul. 4, 2016

(65) Prior Publication Data

US 2016/0315502 A1 Oct. 27, 2016

Related U.S. Application Data

(63) Continuation-in-part of application No. PCT/CN2014/094490, filed on Dec. 22, 2014.

(30) Foreign Application Priority Data

Jan. 6, 2014 (CN) .......................... 2014 1 0004299

(51) Int. Cl.
*H01F 27/42* (2006.01)
*H01F 37/00* (2006.01)
(Continued)

(52) U.S. Cl.
CPC .............. *H02J 7/025* (2013.01); *H02J 50/10* (2016.02); *H02J 50/50* (2016.02); *H02J 50/70* (2016.02)

(58) Field of Classification Search
CPC .. H02J 50/70; H02J 7/025; H02J 50/50; H02J 50/10
See application file for complete search history.

(56) References Cited

U.S. PATENT DOCUMENTS

| 9,376,026 B2* | 6/2016 | Keeling | .................. H01F 38/14 |
| 2002/0079863 A1* | 6/2002 | Abe | ........................ H01F 38/14 |
| | | | 320/108 |

(Continued)

FOREIGN PATENT DOCUMENTS

| CN | 1941541 A | 4/2007 |
| CN | 102124604 A | 7/2011 |

(Continued)

OTHER PUBLICATIONS

International Search Report of PCT Patent Application No. PCT/CN2014/094490 dated Mar. 11, 2015.

*Primary Examiner* — Alfonso Perez Borroto
*Assistant Examiner* — Esayas Yeshaw

(57) ABSTRACT

A wireless charging transmission device, including a wireless charging transmission circuit module (1.0), a high-frequency alternating-current power transmission line (1.1) and a transmission coil module (1.2), wherein the wireless charging transmission circuit module (1.0) is installed in an energy conversion part shell (1.4), the transmission coil module (1.2) is installed in an energy transmission part shell (1.5), and the wireless charging transmission circuit module (1.0) is electrically connected to the transmission coil module (1.2) via the high-frequency alternating-current power transmission line (1.1), so that the energy of the wireless charging transmission circuit module (1.0) is transmitted to the transmission coil module (1.2) at a very high frequency. The wireless charging transmission device can reduce the heat amount in a wireless charging region and nearby regions significantly and make a wireless charger small in size and extremely thin.

20 Claims, 4 Drawing Sheets

(51) Int. Cl.
*H01F 38/00* (2006.01)
*H02J 7/02* (2016.01)
*H02J 50/70* (2016.01)
*H02J 50/10* (2016.01)
*H02J 50/50* (2016.01)

(56) References Cited

U.S. PATENT DOCUMENTS

| | | | | |
|---|---|---|---|---|
| 2009/0101635 | A1* | 4/2009 | Yokoyama | G03G 15/2053 219/619 |
| 2010/0264748 | A1* | 10/2010 | Tucker | H01Q 7/00 307/104 |
| 2012/0098484 | A1* | 4/2012 | Cheng | H01F 38/14 320/108 |
| 2013/0293025 | A1* | 11/2013 | Xu | H02J 17/00 307/104 |
| 2014/0191568 | A1* | 7/2014 | Partovi | H02J 7/025 307/9.1 |
| 2016/0056664 | A1* | 2/2016 | Partovi | H02J 7/025 307/104 |

FOREIGN PATENT DOCUMENTS

| | | |
|---|---|---|
| CN | 102593957 A | 7/2012 |
| CN | 202888898 U | 4/2013 |
| CN | 203014443 U | 6/2013 |
| CN | 203326678 U | 12/2013 |

\* cited by examiner

WIRELESS CHARGING TRANSMISSION DEVICE

CROSS-REFERENCE TO RELATED APPLICATIONS

The present application is a Continuation-in-part Application of PCT application No. PCT/CN2014/094490 filed on Dec. 22, 2014, which claims the benefit of Chinese Patent Application No. 201410004299.8 filed on Jan. 6, 2014, the contents of which are hereby incorporated by reference.

TECHNICAL FIELD

The present patent application relates to a wireless charging transmission device, in particular to a high frequency AC transmission line used in a wireless charging transmission line for transmission of high frequency AC energy at a long distance, and relationship of space positions of modules in a wireless charging device.

BACKGROUND

Technologies for a wireless charger are as follows. Usually, a direct current is converted into a high frequency AC, and then a high frequency AC electrically drives an emission coil to transfer alternating electric magnetism to a receiving coil and then converts the sensed alternating current into the direct current and transmits the direct current to devices as power supply, as shown in patent literatures CN200510030239.4 and CN201110020352.X.

A wireless charging emitter product usually includes four parts, namely a DC power supply module, a DC power transmission line, a wireless charging transmission circuit module and an transmission coil module, wherein the DC power supply module usually is an adapter and a large-capacitance battery, and the DC power transmission line is a conventional power wire only suitable for transmission of power DC electricity and low-frequency signal AC electricity, for example a USB wire. The wireless charging transmission circuit module and the transmission coil module usually are installed in the same housing, and merely installed in two or more housings which are partly and closely connected in a mechanical way to form a group, thus facilitating production and installation, meeting the demands on the frame design of the existing wireless charging emitter, and being practically operable. For example, patent CN201220552440.4 discloses the realization mode the majority of the existing wireless charging emitter product. Some wireless charging emitter products have the DC power module, the wireless charging transmission circuit module and the transmission coil module assembled in one housing, and do not have the DC power transmission line, as shown in CN201220725129.5.

The wireless charging transmission circuit module has an efficiency usually lower than 90% during DC-AC conversion, and therefore causes certain power loss and generates a lot of heat. The power loss is usually not smaller than 1 W and the heat is equivalent to the heat generated by two small bulbs. During the actual wireless charging process, the housing transmits a great amount of heat to the wireless charging receiving devices, so the heat received by the receiving device is more than the heat generated when the charging is directly executed by using a lead. Thus, the service life of the product and the reliability of the product are affected, and at the same time, many potential users dare not to use the wireless charger and worry about dangers such as the receiving devices exploded because of being too hot.

To solve the above problems, during the design of the exiting wireless charging emitter product, the transfer and dissipation of the heat must be taken into consideration to reduce the heat transmitted to the receiving devices as much as possible. However, the cost in housing design and materials during the manufacturing are increased first. According to the thermodynamic principle, the existing wireless emitter cannot realize small size, ultra-thinness, and extremely low heating temperature at the same time. Therefore, the thickness of the existing wireless charging emitter cannot be lower than 5 mm, and the interior capacitance of the housing cannot be smaller than 32,000 $mm^3$(bigger than a cigarette case). At the same time, during wireless charging, the temperature rise of the receiving device is higher than 25° C. (maximum rise over 40° C.), so many wireless charging emitters are manufactured by using technologies such as "increasing heat dissipating holes, using heat-dissipating silica gel in a large area, designing uneven housing surface to increase heat dissipation." However, the effect is undesirable effect; cost is increased; product appearance is not good; and most important is that a large space is occupied, affecting the daily use of users.

For example, use of the wireless chargers on a dining table, tea table, and desk is the mostly desired effect of the developers of such products, so users can charge devices at any time and at any place. Meanwhile, economical benefits are increased, while social life is promoted. However, in actual use, due to the thickness and size of the existing wireless chargers, and due to limit in the use of the wireless charging emitter product in areas within the reach of user's arms, it is very easily for users to "move, press and turn" the wireless charging emitter in daily life, hindering user and causing damage. At the same time, the wireless chargers also affect other aspects of the daily life, for example, "a large area is occupied, and there is no more space for may tee cup, or my eraser is invisible when the wireless charging is not needed." Therefore, the wireless charger can get into daily life only by reduction of the size and thickness of the wireless charger. However, the prior art fails to do so.

For example, various tables manufactured in a furniture plant can be added with the wireless emitter products. If the existing wireless charger is used, a large hole must be bored on the table top to embed the wireless charger, as shown in the patent CN201320440252.7. Meanwhile, installation and decoration are executed by using expensive technologies. Finally, the cost of every table with the wireless charging emitter function is several times that of a common table. Therefore, such product has no marketing value. Moreover, boring a hole on a table is impossible in many cases. There is no suitable solution for neglecting the thickness or size of the wireless charger. Therefore, the wireless chargers using such technology cannot be promoted in a large area and has no significance for social development.

Practical and potential sales volume determines the production cost and the price. Large-scale promotion of the wireless charger products is impossible in current situations, and the wireless charger products are accepted by some fans in a very small scope. This is why the existing wireless charger product is 10 and even more times expensive than the traditional wired charger and cannot be quickly widely popularized.

SUMMARY

The wireless charging transmission circuit module inevitably generates a great amount of heat. On in the case that the wireless charging transmission circuit module does not contact the receiving devices and even is far away from the receiving devices, users do not feel hot and the wireless charging emission portion is reduced in size and thickness.

In the present patent application, a very long segment of high frequency AC transmission line is added to connect the wireless charging transmission circuit module and the transmission coil module and separate the two in space by a long distance, so the wireless charging transmission circuit module and the transmission coil module can be installed in two housings, and the wireless charging transmission circuit module can be placed at a place away from users. In this way, the heat generated by the wireless charging transmission circuit module is not transmitted to the receiving devices, and the heat of the receiving devices is the same generated when charging is carried out via a wire. This is just like the charging system of notebook computer keeps an adapter which generates heat seriously far away from the notebook computer to avoid heating the notebook computer. In this way, users do not feel that heat is inevitably generated during wireless charging and will accept wireless charging products mentally. Besides, the heat problem is solved. The structure and housing design of a product can be greatly simplified, achieving a very small thickness and a very small size easily. Then, wireless charging products which do not affect the daily life of users can be manufactured, bringing convenience to users and prompting the development of the society, and therefore are wireless chargers with actual promotion significance. Thus, millions of sales volume of the wireless chargers will be generated.

Compared with the DC transmission lines, the high frequency AC transmission line is increased in production cost, but the cost of the wireless charging emitter can be reduced in the aspects of design, testing, mold, housing, heat dissipating materials, etc., so the cost of the wireless charger product is kept unchanged, and even reduced. When the sales volume reaches the level of billions, the price of the wireless charger product can be close to and even identical with the exiting wireless charger.

In actual products, the thickness of a wireless charging area of a novel wireless charging emitter can be smaller than 2 mm, which is smaller than that of a coin, so the wireless charging emitter is usually untouched in daily life, and users will not worry about scratching of own mobile phones after the mobile phones fall down. Meanwhile, the minimum length and width, about 50 mm, and various required surfaces can be achieved. In this way, manufacturers such as furniture manufacturers can fix the wireless charging emitter at existing products by affixing and therefore develop novel products having the wireless charging function with extremely low cost.

Moreover, the wireless charging emission circuit can be directly welded together with the above mentioned DC power module, and even can be manufactured on the same circuit board with all DC power supply line canceled. The manufactured products are similar to existing adapters, which is more suitable for promotion and acceptance.

To fulfill the above objectives, thermodynamic analysis shall be carried on the wireless charger products to calculate the heat generated by each module in the wireless charger. Through simulation in a computer, it is found that the heat generated by the wireless charging transmission circuit module accounts for about 70-80%, and the heating area of a circuit board is a large-power area where a direct current is converted into an alternating current. For the existing wireless charger, its housing cannot be laid with a large area of metal or conductive graphite for heat dissipation, and even if the metal or conductive graphite is laid, the heat of the existing wireless charger is directly transmitted to the receiving devices.

Therefore, the heating source must be kept away from the wireless charging area first, namely away from the transmission coil module for wireless charging.

Next, a lead capable of transmitting the energy is required to be designed according to the high frequency AC large-power energy converted by the wireless charging transmission circuit module. Due to the large power, the cross section area of the lead must be also large; otherwise, the resistance is very large, which can limit the transmission power; besides, the AC frequency is every high, so the follow-up effect of the conductor must be considered, and the diameter of the lead must be smaller than a certain value.

Through combination of the above mentioned two factors, there are two types of lead actually obtained. One is multi-strand enameled wires, wherein the diameter of each enameled wire is smaller than or equal to twice of the follow-up depth of the working frequency. The other is a flat and narrow insulating metal tape, wherein the thickness of the flat and narrow insulating metal tape is smaller than or equal to twice of the follow-up depth of the working frequency.

In this way, the lead can transmit the high frequency AC large-power energy, and as a high frequency AC transmission line, transmit the high frequency AC large-power energy converted by the wireless charging transmission circuit module to the transmission coil module for use.

DETAILED DESCRIPTION

Figure 1:
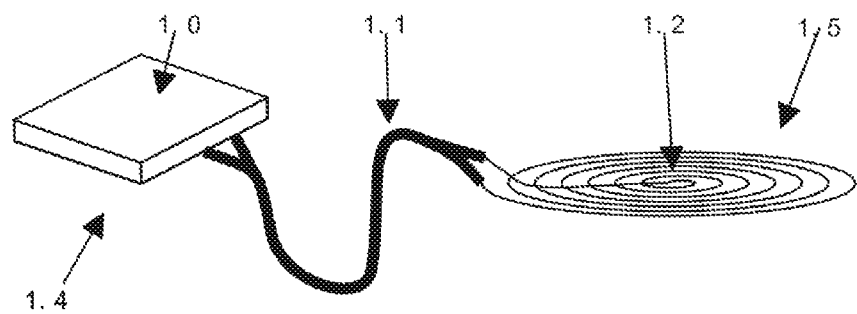
FIG. 1 is an illustration of the modules and connection relationships of the present patent application.

As shown in FIG. 1, the realization of the present patent application is as follows. A high frequency AC transmission line 1.1 is welded at a wireless energy output end of a wireless charging transmission circuit module 1.0; then the other end of the high frequency AC transmission line 1.1 is welded at a lead terminal of an transmission coil module 1.2, realizing electric connection between the wireless charging transmission circuit module 1.0 and the transmission coil module 1.2, and realizing transfer of the high frequency energy output by the wireless charging transmission circuit module 1.0 to the transmission coil module 1.2 to perform emission of wireless energy. Besides, the wireless charging transmission circuit module 1.0 is installed in an energy conversion housing 1.4; the transmission coil module 1.2 is installed in an energy transmission part shell 1.5; the energy conversion housing 1.4 and the energy transmission part shell 1.5 are different, thus realizing the effect that the heat generated by the wireless charging transmission circuit module 1.0 during working is away from the energy transmission part shell 1.5 usually touched by users in daily life.

Figure 2:
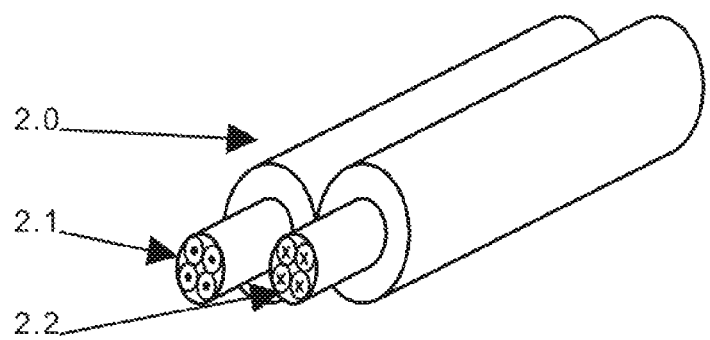
FIG. 2 is a schematic view of the first embodiment of a high frequency AC transmission line of the present patent application.

As shown in FIG. 2, disclosed is the realization mode of a high frequency AC transmission line 2.0 of the present patent application, which includes two paths of multi-strand enameled wires 2.1 and 2.2 in forward and reverse directions respectively. The two paths of multi-strand enameled wires 2.1 and 2.2 are in a parallel or similar parallel structure relationship. Such realization mode is the simplest in actual production, has problems of electromagnetic leakage and poor anti-interference.

Figure 3:
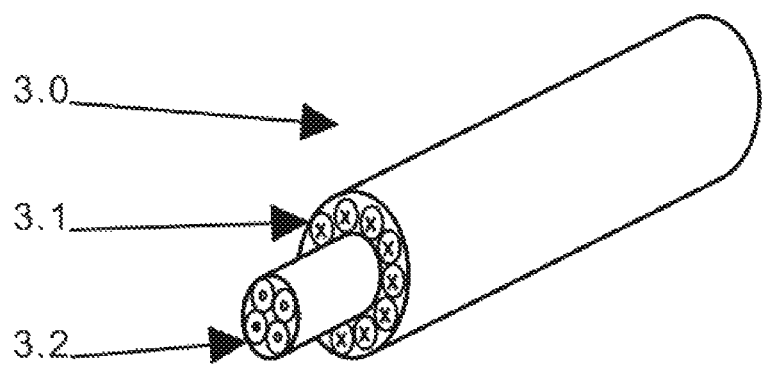
FIG. 3 is a schematic view of the second embodiment of a high frequency AC transmission line of the present patent application.

As shown in FIG. 3, disclosed is the realization mode of a high frequency AC transmission line 3.0 of the present patent application, which includes two paths of multi-strand enameled wires 3.1 and 3.2 in forward and reverse directions respectively. The two paths of multi-strand enameled wires 3.1 and 3.2 are in a coaxial relationship, wherein one path of the multi-strand enameled wires 3.1 surrounds the other path of multi-strand enameled wires 3.2, with an insulating layer filled between the two to prevent short circuiting due to de-painting after the contact areas of the two paths of multi-strand enameled wires are worn in use. This realization mode is very complicated in actual application, and imposes very high requirements on the production and processing technologies. Theoretically, there is no electromagnetic leakage and the anti-interference is strong, but disqualification of processing also tend to generate electromagnetic leakage and poor anti-interference. Besides, this realization mode is disadvantaged in poor heat dissipation and imposes high very high requirements on copper materials and insulation and heat dissipation design.

Figure 4:
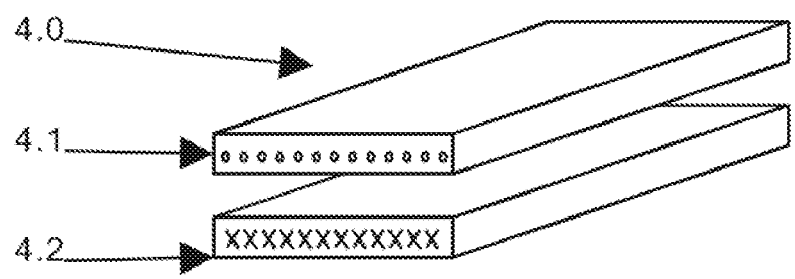
FIG. 4 is a schematic view of the third embodiment of a high frequency AC transmission line of the present patent application.

As shown in FIG. 4, disclosed is the realization mode of a high frequency AC transmission line 4.0 of the present patent application, which includes two paths of flat and narrow insulating metal tapes 4.1 and 4.2 in forward and reverse directions respectively. The two paths of flat and narrow insulating metal tapes 4.1 and 4.2 are in a wide-opposite parallel or approximately parallel structure relationship as shown in FIG. 4, or in a wide-face parallel structure relationship on one horizontal plane or approximately horizontal plane. During actual production, such structure can be manufactured by cutting soft film circuit board FPC or FFC and a dual-layer metal foil with an insulating design. The processing is easy. Width specifications vary with power. Besides, such structure can be used almost without secondary processing. Moreover, a frequently-used external insulating skin for covering a common electric wire is hardly needed, so the thickness can be very small. However, such realization mode also has problems of electromagnetic leakage and poor anti-interference.

Figure 5:
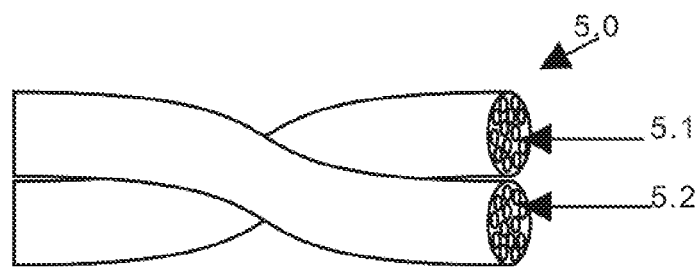
FIG. 5 is a schematic view of the fourth embodiment of a high frequency AC transmission line of the present patent application.

As shown in FIG. 5, disclosed is the realization mode of a high frequency AC transmission line 5.0 of the present patent application, which includes two paths of multi-strand enameled wires 5.1 and 5.2 in forward and reverse directions respectively. The two paths of multi-strand enameled wires 5.1 and 5.2 are in a twisted-pair structure relationship. Such realization, like co-axial design, can solve problems of electromagnetic leakage and poor anti-interference, features in low degree of processing complication, and has improved in the aspect of heat dissipation. However, the thickness of the finally obtained structure is twice that of the parallel structure, and more lead materials are used in comparison with other modes.

Figure 6:
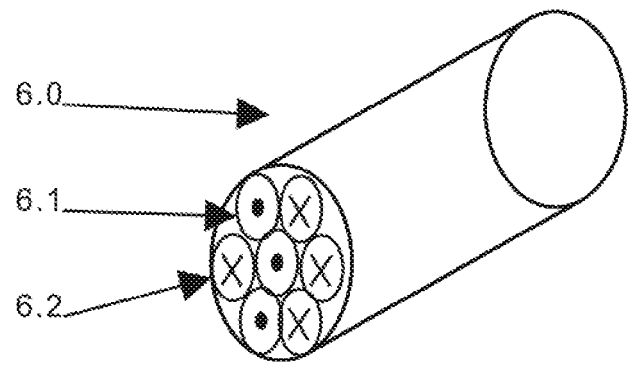
FIG. 6 is a schematic view of the fifth embodiment of a high frequency AC transmission line of the present patent application.

As shown in FIG. 6, disclosed is the realization mode of a high frequency AC transmission line 6.0 of the present patent application, which includes two paths of multi-strand enameled wires 6.1 and 6.2 in the forward direction. The two paths of multi-strand enameled wires 6.1 and 6.2 are mixed together. Such realization mode can solve the problems of electromagnetic leakage and poor anti-interference well, but is disadvantaged in a very high degree of processing complication and heat dissipation. Besides, during actual application, it is very difficult to efficiently separate every path of wire for welding.

Figure 7:
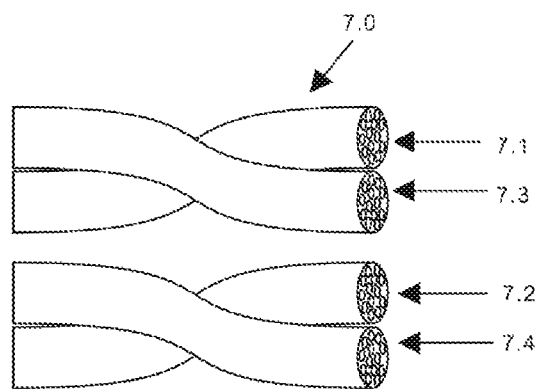
FIG. 7 is a schematic view of the sixth embodiment of a high frequency AC transmission line of the present patent application.

As shown in FIG. 7, disclosed is a realization mode of another high frequency AC transmission line 7.0 of the present patent application, which comprises more paths of multi-strand enameled wires 7.1 and 7.2 in the forward direction and equivalent paths of multi-strand enameled wires 7.3 and 7.4 in the reverse direction. Every path of multi-strand enameled wires in the forward direction together with one path of multi-strand enameled wires in the reverse direction forms a corresponding group 7.1 and 7.3, 7.2 and 7.4, independently, and each group is in a parallel, co-axial or twisted-pair relationship, thus effectively solving problems of the thickness, heat and power of the high frequency AC transmission line. For example, if the transmission power is determined, the original two paths of multi-strand enameled wires can be divided into four or more paths, reducing the diameter of each path of multi-strand enameled wires, and increasing the heat dissipating area. Or, if flat and narrow insulating metal tapes are used as the transmission material, then the transmission line can be manufactured by cutting multi-layer, wide-opposite, parallel soft film circuit boards FPC or FFC arranged in the forward and reverse directions alternatively or multi-layer metal foils of insulating design, thus effectively solving the problems of electromagnetic leakage and poor anti-interference under the condition of ensuring the thickness.

Figure 8:
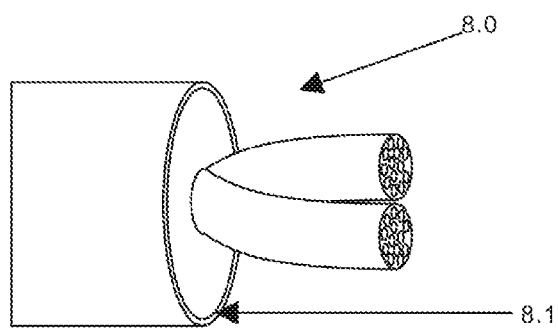
FIG. 8 is a schematic view of an embodiment in which a high frequency AC transmission line of the present patent application solves EMI/EMC problems.

As shown in FIG. 8, disclosed is a shielding mode of a high frequency AC transmission line 8.0. The high frequency AC transmission line is added with a conductive metal layer 8.1 on the outside layer, and the conductive metal layer is electrically connected with a shielding network of the wireless charging transmission circuit module or the wireless charging coil module. The conductive metal layer can also wraps each group or each path of multi-strand enameled wires or flat and narrow insulating metal tapes to further reduce the mutual interference between groups or paths. For example, if the flat and narrow insulating metal tapes are used, the outside layer and the middle layer of the soft film circuit boards FPC or FFC can be used as the shielding layers. In this way, the degree of production and processing complication is lowered.

Figure 9:
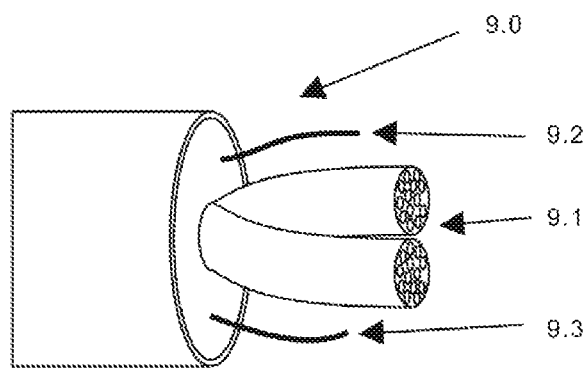
FIG. 9 is a schematic view of the sixth embodiment of a high frequency AC transmission line of the present patent application.

As shown in FIG. 9, disclosed is a mode of realizing transmission of other electric signals of a high frequency AC transmission line 9.0 of the present patent application. Leads

9.2 and 9.3 for transmitting electric signals are added next to the multi-strand enameled wires 9.1, realizing transmission of other electric signals. Through such realization mode, the wireless charging transmission device has more application functions, for example, the transmission coil module can be added with indicator lights, temperature sensors, etc.

Figure 10:
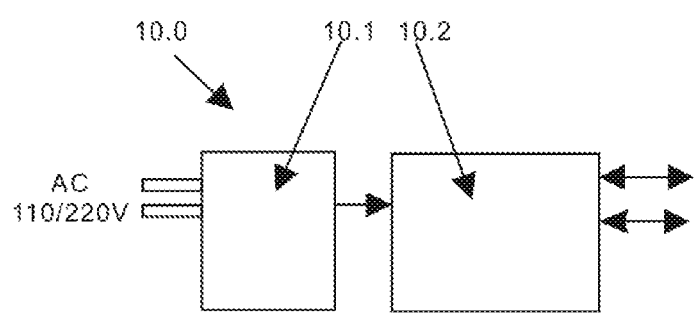
FIG. 10 is an illustration of the composition and the connection relationship of an internal module capable of supplying power directly from the mains supply of a wireless charging transmission circuit module of the present patent application.

As shown in FIG. 10, disclosed is a realization mode of a wireless charging transmission circuit module 10.0 of the present patent application. The wireless charging transmission circuit module 10.0 comprises two parts, namely a mains supply conversion sub-module 10.1 and a wireless charging high frequency AC energy generation sub-module 10.2 inside; and the mains supply conversion sub-module 10.1 supplies power to the wireless charging high frequency AC energy generation sub-module 10.2. Therein the mains supply conversion sub-module 10.1 has a function of converting the mains supply into specific electric energy required by the wireless charging high frequency AC energy generation sub-module 10.2. Such realization mode can solve the problem of unstable wireless charging caused by insufficient power of the majority of civil adapters available on the market, reduces the inconvenience caused by the current wireless charging products which must be equipped with an adapter, and can also reduce the overall cost.

What is claimed is:

1. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of forward multi-strand enameled wires and equivalent reverse multi-strand enameled wires inside; the one path of or each of the more paths of forward multi-strand enameled wires is close to one path of reverse multi-strand enameled wires; those two close paths of multi-strand enameled wires form a group; the two paths of multi-strand enameled wires in each group are in a parallel or similar parallel structural relationship; one end of a certain path of forward multi-strand enameled wires among the enameled wires is welded together with a certain end of the wireless energy output ends of the wireless charging transmission circuit module, while one end of the reverse multi-strand enameled wires in the same group with the path of forward multi-strand enameled wires is welded together with the corresponding another end of the wireless energy output ends of the wireless charging transmission circuit module; another end of the path of forward multi-strand enameled wires is welded together with one of lead terminals of a certain coil of the transmission coil module, and another end of the reverse multi-strand enameled wires in the same group with the path of forward multi-strand enameled wires is welded together with another lead terminal of the coil of the transmission coil module.

2. The wireless charging transmission device according to claim 1, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

3. The wireless charging transmission device according to claim 1, wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high-frequency AC transmission line.

4. The wireless charging transmission device according to claim 1, wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

5. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of forward multi-strand enameled wires and equivalent reverse multi-strand enameled wires; the periphery of the one path of or each of the more paths of forward multi-strand enameled wires is surrounded by one path of reverse multi-strand enameled wires, and those two paths of multi-strand enameled wires are in a coaxial or similar coaxial structure relationship and belong to the same group; one end of a certain path of forward multi-strand enameled wires among the enameled wires is welded together with a certain end of the wire-less energy output ends of the wireless charging transmission circuit module, while one end of the reverse multi-strand enameled wires in the same group with the path of forward multi-strand enameled wires is welded together with the corresponding another end of the wireless energy output ends of the wireless charging transmission circuit module; another end of the path of forward multi-strand enameled wires is welded together with one of lead terminals of a certain coil of the transmission coil module, and another end of the reverse multi-strand enameled wires in the same group with the path of forward multi-strand enameled wires is welded together with another lead terminal of the coil of the transmission coil module.

6. The wireless charging transmission device according to claim 5, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

7. The wireless charging transmission device according to claim 5, wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

8. The wireless charging transmission device according to claim 5, wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

9. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of forward multi-strand enameled wires and equivalent reverse multi-strand enameled wires inside; the one path of or each of the more paths of forward multi-strand enameled wires is and close to one path of reverse multi-strand enameled wires; those two close paths of multi-strand enameled wires form a group; the two paths of multi-strand enameled wires in each group are in a twisted-pair structure relationship; one end of a certain path of forward multi-strand enameled wires among the enameled wires is welded together with a certain end of the wireless energy output ends of the wireless charging transmission circuit module, while one end of the reverse multi-strand enameled wires twisted with the path of forward multi-strand enameled wires is welded together with the corresponding another end of the wireless energy output ends of the wireless charging transmission circuit module; another end of the path of forward multi-strand enameled wires is welded together with one of lead terminals of a certain coil of the transmission coil module, and another end of the reverse multi-strand enameled wires twisted with the path of forward multi-strand enameled wires is welded together with another lead terminal of the coil of the transmission coil module.

10. The wireless charging transmission device according to claim 9, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

11. The wireless charging transmission device according to claim 9, wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

12. The wireless charging transmission device according to claim 9, wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

13. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of forward multi-strand enameled wires and equivalent reverse multi-strand enameled wires inside; the one path of or each of the more paths of multi-strand enameled wires is mixed with one path of reverse multi-strand enameled wires; those two mixed paths of multi-strand enameled wires form a group; the two paths of multi-strand enameled wires in each group are mixed together in space to generate in a parallel structure relationship; one end of a certain path of forward multi-strand enameled wires among the enameled wires is welded together with a certain end of the wireless energy output ends of the wireless charging transmission circuit module, while one end of the reverse multi-strand enameled wires twisted with the path of forward multi-strand enameled wires is welded together with the corresponding another end of the wireless energy output ends of the wireless charging transmission circuit module; another end of the path of forward multi-strand enameled wires is welded together with one of lead terminals of a certain coil of the transmission coil module, and another end of the reverse multi-strand enameled wires twisted with the path of forward multi-strand enameled wires is welded together with another lead terminal of the coil of the transmission coil module.

14. The wireless charging transmission device according to claim 13, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

15. The wireless charging transmission device according to claim 13, wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line.

16. The wireless charging transmission device according to claim 13, wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

17. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of forward flat and narrow insulating metal tapes and equivalent reverse flat and narrow insulating metal tapes; the one path or more paths of forward flat and narrow insulating metal tapes are close to one path of reverse flat and narrow insulating metal tapes; the tow paths of flat and narrow insulating metal tapes form a group; the flat and narrow insulating metal tapes in each group are in a parallel structure relationship, or in a wide-opposite parallel structure relationship, or in a wide-horizontal parallel structure relationship; one end of a certain path of forward flat and narrow insulating metal tapes among the flat and narrow insulating metal tapes is welded together with a certain end of the wireless energy output ends of the wireless charging transmission circuit module, while one end of the reverse flat and narrow insulating metal tapes in the same group with the path of forward flat and narrow insulating metal tapes is welded together with the corresponding another end of the wireless energy output ends of the wireless charging transmission circuit module; another end of the path of forward flat and narrow insulating metal tapes is welded together with one of lead terminals of a certain coil of the transmission coil module, and another end of the reverse flat and narrow insulating metal tapes in the same group with the path of forward flat and narrow insulating metal tapes is welded together with another lead terminal of the coil of the transmission coil module.

18. The wireless charging transmission device according to claim 17, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line; wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line; wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

19. A wireless charging transmission device, comprising: a wireless charging transmission circuit module, a high-frequency alternating-current power transmission line, and an transmission coil module, wherein the wireless charging transmission circuit module is installed in an energy conversion housing, and the transmission coil module is installed in an energy transmission part shell, the energy conversion housing and the energy transmission part shell are two independent housings without connection; the wireless charging transmission circuit module is electrically connected to the transmission coil module via the high-frequency alternating-current power transmission line, so that the energy of the wireless charging transmission circuit module is transmitted to the transmission coil module at a very high frequency, and realizing transmission of the wireless energy; the wireless charging transmission circuit module is capable of converting energy input from the outside world into the high-frequency AC energy for wireless charging, and has two or more wireless energy output ends for outputting high-frequency AC energy; the high-frequency alternating-current power transmission line is capable of transferring the high-frequency AC electric energy for wireless charging, has a length which is twice or more of the length of the wireless charging transmission circuit module, and is made from materials suitable for and has a structure suitable for high-frequency AC energy; and the transmission coil module has one or more emission coil sub-modules, and therefore has two or more coil terminals for inputting the high-frequency AC electric energy and emitting the same outside to realize output of the wireless energy; wherein the high-frequency alternating-current power transmission line has one or more paths of signal transmission leads for transmitting other electric signals of non-wireless charging electric energy; the wireless charging transmission circuit module also has a welding point for input and output of other signals, which is used for inputting and outputting other electric signals of non-wireless charging energy; the transmission coil module also has a welding point for input and output of other signals, which is used for inputting and outputting other electric signals of non-wireless charging energy; one end of a certain path of the signal transmission leads is welded at the corresponding welding point for input and output of other signals of the wireless charging transmission circuit module, while the other end of the path of signal transmission leads is welded at the corresponding welding point for input and output of other signals of the transmission coil module, realizing electric connection between the wireless charging transmission circuit module and other electric signals of the transmission coil module.

20. The wireless charging transmission device according to claim 19, wherein the high-frequency alternating-current power transmission line has a metal shielding layer; the wireless charging transmission circuit module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line; wherein the high-frequency alternating-current power transmission line has a metal shielding layer; the transmission coil module also has a shielding network and a shield welding point; the metal shielding layer and the shield welding point are in electric connection through welding to reduce electromagnetic interference emitted by the high frequency AC transmission line to the outside world and reduce the external electromagnetic interference with the high frequency AC transmission line; wherein the wireless charging transmission circuit module comprises a mains supply conversion sub-module and a wireless charging high frequency AC energy generation sub-module inside; and the mains supply conversion sub-module supplies power to the wireless charging high frequency AC energy generation sub-module, wherein the mains supply conversion sub-module has a function of converting the mains supply into specific electric energy required by the wireless charging high frequency AC energy generation sub-module.

* * * * *